(12) United States Patent
Salter et al.

(10) Patent No.: US 10,696,272 B2
(45) Date of Patent: Jun. 30, 2020

(54) VEHICLE LIGHTING SYSTEM FEATURING OBJECT IDENTIFICATION AND THREAT LEVEL ASSESSMENT

(71) Applicant: Ford Global Technologies, LLC, Dearborn, MI (US)

(72) Inventors: Stuart C. Salter, White Lake, MI (US); Paul Kenneth Dellock, Northville, MI (US); Christopher Charles Hunt, Livonia, MI (US); Chad Hoover, Washington, MI (US); Doug H. Randlett, Metamora, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 15/945,083

(22) Filed: Apr. 4, 2018

(65) Prior Publication Data

US 2019/0308587 A1 Oct. 10, 2019

(51) Int. Cl.

| | | |
|---|---|---|
| *B60R 25/104* | (2013.01) |
| *E05F 15/73* | (2015.01) |
| *B60Q 1/26* | (2006.01) |
| *B60R 25/01* | (2013.01) |
| *B60R 25/10* | (2013.01) |
| *B60R 25/31* | (2013.01) |

(52) U.S. Cl.
CPC .......... *B60R 25/104* (2013.01); *B60Q 1/2611* (2013.01); *B60R 25/01* (2013.01); *B60R 25/1001* (2013.01); *B60R 25/31* (2013.01); *E05F 15/73* (2015.01); *E05F 2015/763* (2015.01); *E05F 2015/767* (2015.01); *E05Y 2400/44* (2013.01); *E05Y 2400/45* (2013.01); *E05Y 2900/55* (2013.01)

(58) Field of Classification Search
CPC ... B60R 25/104; B60R 25/01; B60R 25/1001; B60R 25/31; E05F 15/73; B60Q 1/2611
USPC .......................................................... 701/49
See application file for complete search history.

(56) References Cited

U.S. PATENT DOCUMENTS

| | | | |
|---|---|---|---|
| 5,243,894 A | 9/1993 | Minovitch | |
| 6,741,165 B1* | 5/2004 | Langfahl | B60R 25/1004 307/10.2 |
| 7,103,473 B2* | 9/2006 | Ranjan | G01C 21/3667 340/905 |
| 7,570,155 B2 | 8/2009 | Horii | |
| RE43,335 E | 5/2012 | Schwartz | |
| 9,437,111 B2* | 9/2016 | Ignaczak | G08G 1/165 |
| 9,738,253 B2 | 8/2017 | Czyz et al. | |
| 9,747,795 B1 | 8/2017 | Espinosa | |
| 10,421,437 B1* | 9/2019 | Koskan | G08B 13/181 |

(Continued)

FOREIGN PATENT DOCUMENTS

WO          9501890          1/1995

*Primary Examiner* — Yazan A Soofi
(74) *Attorney, Agent, or Firm* — David Coppiellie; Price Heneveld LLP

(57) ABSTRACT

A lighting system of a vehicle is provided herein and includes an external lighting device, one or more sensors configured to detect an object approaching the vehicle, and a controller configured to identify the object and assess a threat level thereof based on input from the one or more sensors. If the controller determines that the object is high threat, the controller operates the external lighting device to produce an illumination sequence in the direction of the object.

20 Claims, 5 Drawing Sheets

(56) References Cited

U.S. PATENT DOCUMENTS

2011/0285519 A1* 11/2011 Scheuermann .......... B60Q 1/50
340/425.5
2017/0368982 A1* 12/2017 Dellock ................ B60Q 1/085
2017/0369034 A1* 12/2017 Bilik ...................... B60R 25/34

* cited by examiner

VEHICLE LIGHTING SYSTEM FEATURING OBJECT IDENTIFICATION AND THREAT LEVEL ASSESSMENT

FIELD OF THE INVENTION

The present invention generally relates to lighting systems of a vehicle, and more particularly, to a lighting system adapted to illuminate an object external to the vehicle.

BACKGROUND OF THE INVENTION

Law enforcement officers positioned inside a vehicle may be unaware of an object approaching the vehicle. Accordingly, there is a need to be able to detect an approaching object and notify an officer of its whereabouts. The present disclosure is intended to satisfy this need.

SUMMARY OF THE INVENTION

According to a first aspect of the present invention, a lighting system of a vehicle is provided and includes an external lighting device, one or more sensors configured to detect an object approaching the vehicle, and a controller configured to identify the object and assess a threat level thereof based on input from the one or more sensors. If the controller determines that the object is high threat, the controller operates the external lighting device to produce an illumination sequence in the direction of the object.

According to a second aspect of the present invention, a lighting system of a vehicle is provided and includes an external lighting device, one or more sensors configured to detect a location, speed, distance, and size of an object approaching the vehicle, and a controller configured to determine if the object is human based on input from the one or more sensors, and if so, operate the lighting device to produce an illumination sequence in the direction of the object.

According to a third aspect of the present invention, a lighting method of a vehicle is provided and includes the steps of detecting an object approaching the vehicle using one or more sensors, identifying the object and assessing a threat level thereof based on input from the one or more sensors, and if the object is determined to be high threat, operating an external lighting device to produce an illumination sequence in the direction of the object.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
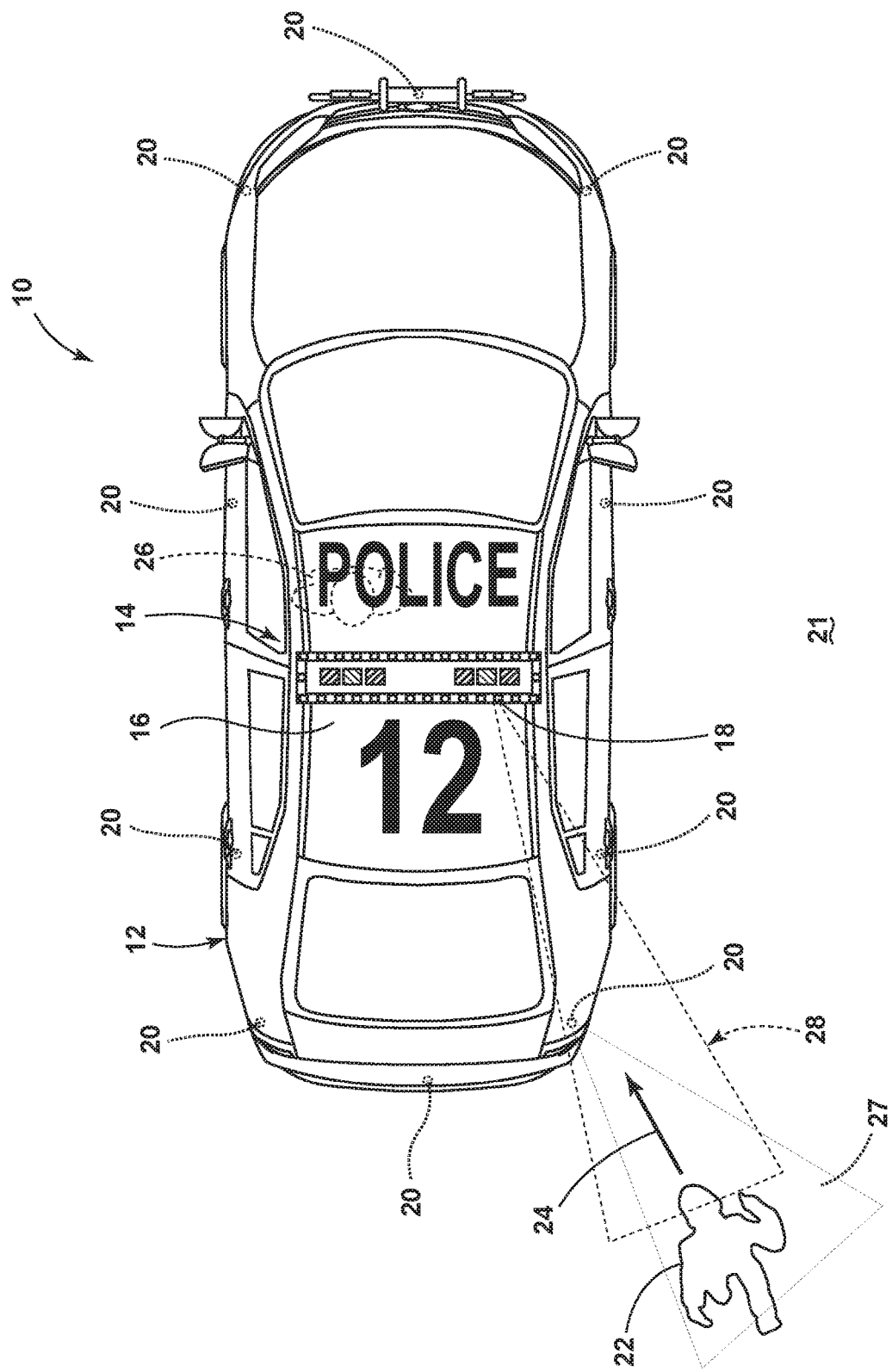
FIG. 1 is a top perspective view of a vehicle equipped with a lighting system.

Referring to FIG. 1, a lighting system 10 of a vehicle 12 is shown. The lighting system 10 is particularly useful for law enforcement and can be readily featured in police vehicles. The lighting system 10 includes an external lighting device 14 configured to produce illumination in a number of directions. In the depicted embodiment, the external lighting device 14 is a light bar module mounted to a roof 16 of the vehicle 12 and including a number of light sources 18 arranged to produce up to 360 degrees of illumination directed away from the vehicle 12. Each light source 18 may include a high beam light-emitting diode coupled to a narrow focus optic such that each light source 18 is operable to produce a concentrated beam of light in a corresponding direction away from the vehicle 12. The lighting system 10 also includes sensors 20 disposed about the vehicle 12 and arranged to provide 360 degree detection of objects located in an operating environment 21 of the vehicle 12. The sensors 20 may each correspond to an ultrasonic sensor or other sensor type configured for object detection. In operation, the sensors 20 are configured to detect a location, speed, distance, and size of an object 22 approaching the vehicle.

As illustrated in FIG. 1, the object 22 is shown approaching the rear of the vehicle 12 from a direction generally represented by arrow 24. As will be described herein, the lighting system 10 is capable of determining the identity and threat level of an object approaching the vehicle 12 based on input from one or more of the sensors 20. For purposes of understanding, the object 22 is represented as a human, which the lighting system 10 may consider to be high threat to an officer 26 positioned inside the vehicle 12. When the object 22 enters an object detection range 27 (e.g., 40 feet) of any one or more of the sensors 20, the object 22 is detected and input is generated by one or more sensors indicating the location, speed, distance, and size of the object 22. The input is then used to ascertain the identity of the object 22 and assess the threat level thereof.

If the object 22 is determined to be high threat, the external lighting device 14 may be operated to produce an illumination sequence 28 in the direction of the object 22. The illumination sequence 28 may serve to assist the officer 26 in viewing the object 22 and may also serve to blind the object 22 in instances where the object 22 is human or some other lifeform. Accordingly, if the object 22 is identified as human, the blinding effect of the illumination sequence 28 may increase a response time in which the officer 26 is able to react to the encounter. It is contemplated that the range of the illumination sequence 28 may be variable, that is, the range may be greater than, lower than, or substantially the same as the detection range 27 of the one or more sensors 20. Furthermore, it is contemplated that the illumination sequence 28 may be achieved using one or more light sources 18 of the external lighting device 14.

Alternatively, if the object 22 is identified as low threat, the external lighting device 14 may be deactivated or operated to produce other illumination sequences that are less invasive to the object 22. Examples of possible low threats may include, for example, small animals and passing vehicles. While examples of high and low threats are provided herein, they should not be seen as dispositive or limiting. That is, any identified object approaching the vehicle 12 may be considered high or low threat based on its location, speed, distance, and size as measured by one or more of the sensors 20. With respect to the examples provided herein, it will be understood that threat level assessment may be an optional feature, that is, the external lighting device 14 may be triggered based on the identification of the object 22 without any determination of threat level. Thus, with respect to the scenario of FIG. 1, the external lighting device 14 may be triggered upon identification of the object 22 as human.

Figure 2:
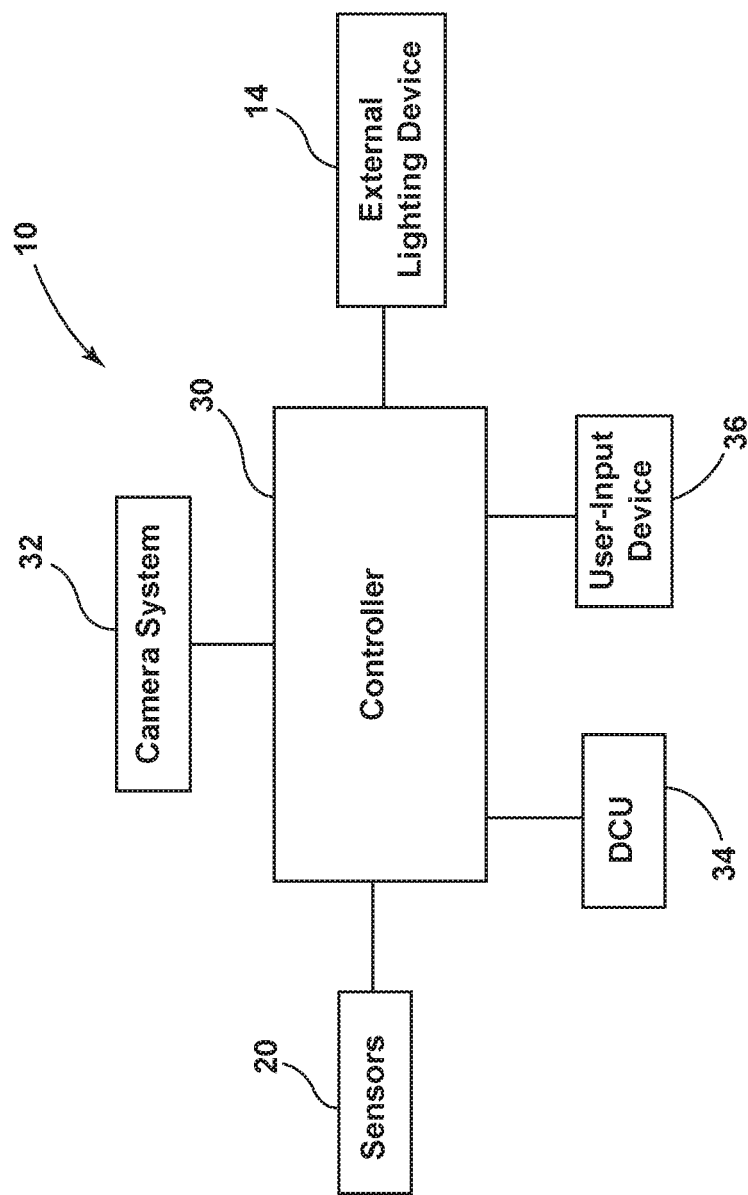
FIG. 2 is a block diagram of the lighting system.

Referring to FIG. 2, the lighting system 10 further includes a controller 30 in communication with the external lighting device 14 and the sensors 20. The aforementioned components may communicate with each other over a conventional vehicle communication network such as a CAN bus or may alternatively be wirelessly coupled using any wireless communication protocol such as Bluetooth. The controller 30 can be an existing vehicle controller, a dedicated controller, or any other controller type, and may additionally be in communication with other systems or devices such as, but not limited to, a camera system 32 provided onboard the vehicle 12 and configured to capture various views external to the vehicle 12, a door control unit (DCU) 34 of the vehicle 12, and a user-input device 36, for example. The user-input device 36 may include a human-machine interface located onboard the vehicle 12 such as a touchscreen display or may be a remote device in the form of a smartphone, tablet, laptop, or other portable electronic device.

Figure 3:
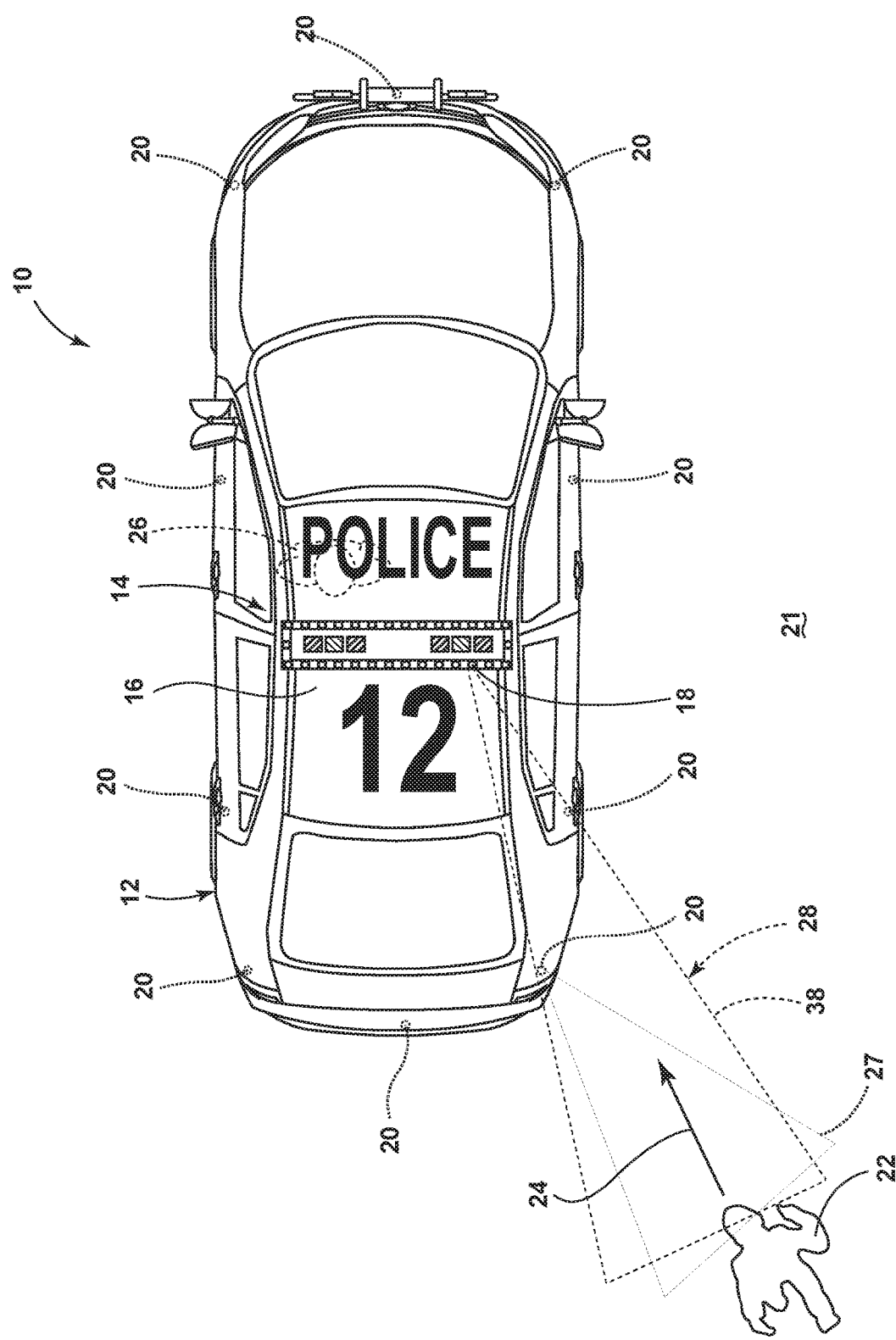
FIGS. 3-5 illustrate an illumination sequence implemented using the lighting system in response to detection of an object approaching the vehicle.
Figure 4:
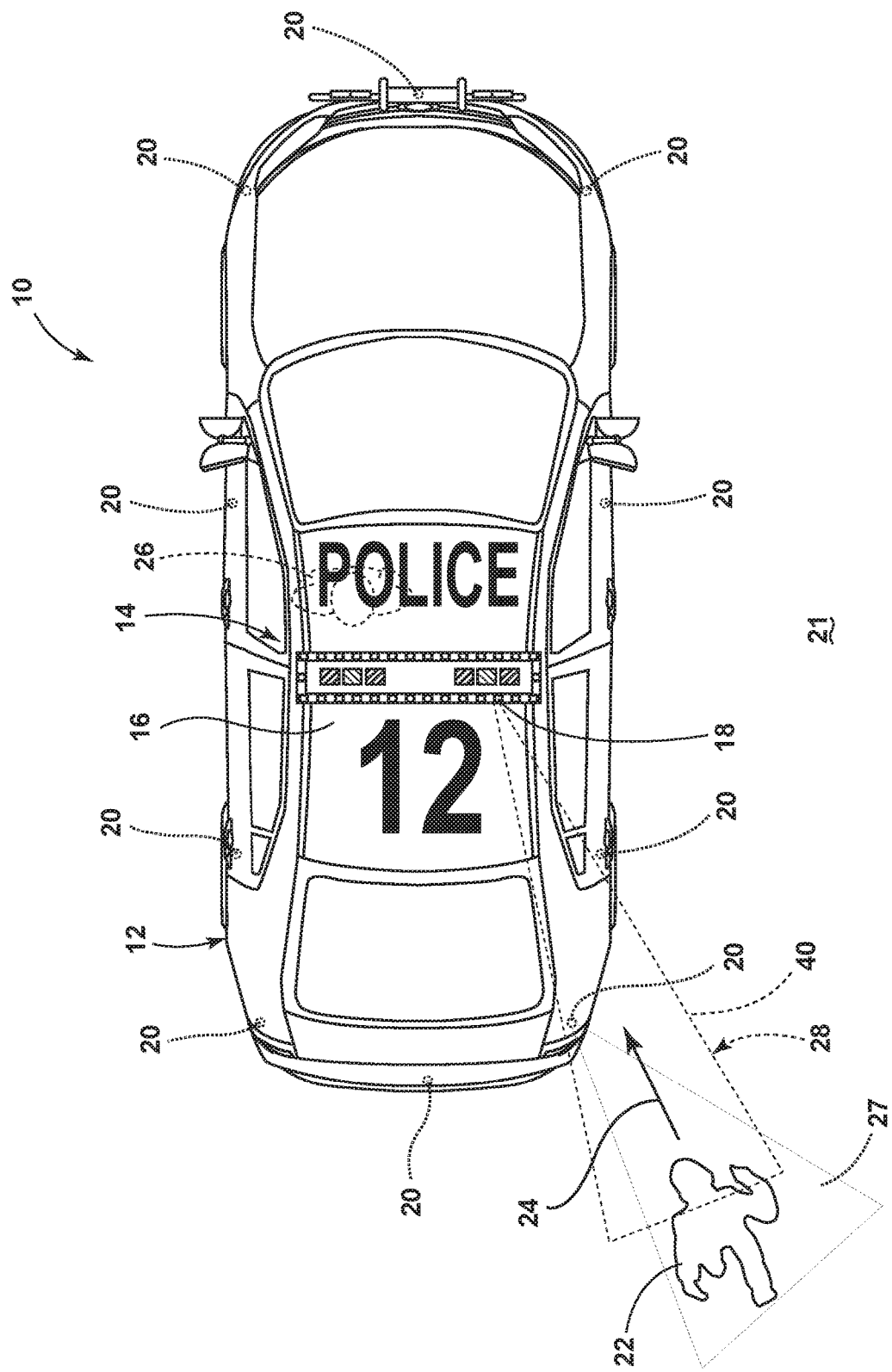
Figure 5:
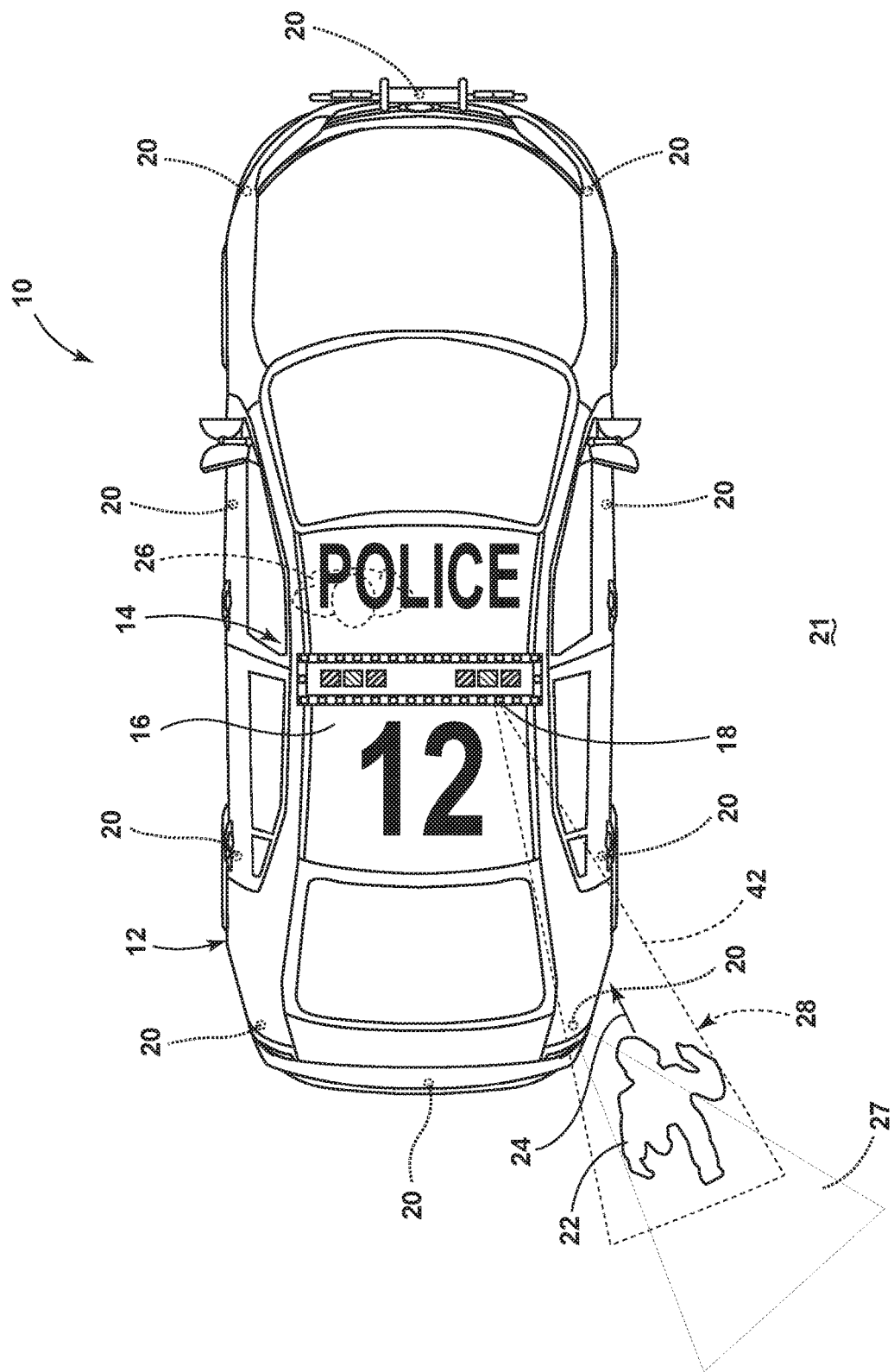

Referring to FIGS. 3-5, an example of the illumination sequence 28 is provided using the scenario shown in FIG. 1. As shown in FIG. 3, the object 22 is detected by one or more of the sensors 20 upon entering the detection range 27 of the one or more sensors 20. In turn, the one or more sensors 20 generate input indicating the location, speed, distance, and size of the object 22. The input is supplied to the controller 30 and the controller 30 uses the input to identify the object 22 and assess the threat level thereof. For purposes of illustration, it is assumed that the object 22 is approaching the vehicle 12 at a relatively quick speed (i.e., running speed). Accordingly, the controller 30 may identify the object 22 as human due to its size and the speed at which the object 22 is moving. By virtue of at least these two measurements, the controller 30 is also able to eliminate objects such as another vehicle or a stationary object from consideration.

Having identified the object 22 as human, the controller 30 may consider the object 22 to be high threat due to its speed as well as its location and distance relative to the vehicle 12. In the illustrated scenario, the object 22 is quickly approaching the vehicle 12 from a rearward direction represented by arrow 24, and as such, the officer 26 may be less capable of seeing the object 22 as compared to an object approaching the vehicle 12 head-on. In response to identifying the object 22 as human and high threat, the controller 30 may operate the external lighting device 14 to produce the illumination sequence 28 illustrated in FIGS. 3-5. As depicted, the illumination sequence 28 includes a first flash of light 38 in the direction of the object 22 (FIG. 3), a second flash of light 40 in the direction of the object 22 (FIG. 4), and a steady stream of light 42 in the direction of the object 22 (FIG. 5). The illumination sequence 28 described herein may be expressed in any color including white.

The first flash of light 38 may be expressed as high intensity light and is intended to blind and disorient the object 22. Recognizing that a human eye blink takes approximately 300-400 milliseconds, the controller 30 may operate the external lighting device 14 to perform the second flash of light 40 in the direction of the object 22 after 500-1000 milliseconds have elapsed since the first flash of light 38. Like the first flash of light 38, the second flash of light 40 may also be expressed as high intensity light and is intended to further blind and disorient the object 22. After the second flash of light 40 or some other number of flashes, the controller 30 may operate the external lighting device 14 to supply the steady stream of light 42 in the direction of the object 22. During this time, the officer 26 may have already directed his or her attention toward the object 22 and the steady stream of light 42 may aid the officer 22 with visual acquisition of the object 22. Additionally, it is contemplated that the camera system 32 may be operated at this time to capture images of the object 22. Furthermore, it is contemplated that the DCU 34 may be operated to automatically close any open windows and lock any unlocked doors associated with the vehicle 12 upon a high threat determination.

In deciding when to trigger the external lighting device 14 to produce the illumination sequence 28, the controller 30 may rely on default settings set by a vehicle manufacturer or settings specified by the officer 26 or other user via the user-input device 36. For example, the officer 26 or other user may set a desired distance, speed, size, and/or location of a detected object necessary to trigger the illumination sequence 28. Additionally, the officer 26 or other user may set the object detection range of the sensors 20, an illumination range of the external lighting device 14, and/or a duration and/or an intensity of the illumination sequence 28 via the user-input device 36. It will be appreciated that one or more of the light sources 18 may be relied upon to achieve the first flash of light 38, the second flash of light 40, the steady stream of light 42, and/or any other light sequence. It will also be appreciated that additional or alternative light sources 18 may be relied upon to accomplish the illumination sequence 28 based on a change in location and/or distance of the object 22.

According to some aspects of the present disclosure, a lighting system of a vehicle is provided. The lighting system includes an external lighting device, one or more sensors configured to detect an object approaching the vehicle, and a controller configured to identify the object and assess a threat level thereof based on input from the one or more sensors. If the controller determines that the object is high threat, the controller operates the external lighting device to produce an illumination sequence in the direction of the object. Embodiments of the first aspect can include any one or a combination of the following features:

the external lighting device includes a light bar module mounted to a roof of the vehicle;

the external lighting device includes a plurality of light sources arranged to produce up to 360 degree illumination directed away from the vehicle;

each of the one or more sensors includes an ultrasonic sensor;

the input includes a location, speed, distance, and size of the object as measured by the one or more sensors;

the illumination sequence includes one or more flashes of light followed by a steady stream of light in the direction of the object;

a camera system configured to capture images of the object when the steady stream of light illuminates the object;

a user-input device configured to receive baser-specified settings that are supplied to the controller and relied upon by the controller to determine when to trigger the external lighting device;

if the controller determines that the object is low threat, the controller deactivates the external lighting device or operates the external lighting device to produce another illumination sequence; and/or a door control unit configured to automatically close any open windows and lock any unlocked doors of the vehicle based on the object being determined to be high threat by the controller.

According to some aspects of the present disclosure, a lighting system of a vehicle is provided. The lighting system includes an external lighting device, one or more sensors configured to detect a location, speed, distance, and size of an object approaching the vehicle, and a controller configured to determine if the object is human based on input from the one or more sensors, and if so, operate the lighting device to produce an illumination sequence in the direction of the object. Examples of the second aspect can include any one or a combination of the following features:

the illumination sequence includes one or more flashes of light followed by a steady stream of light in the direction of the object;

the illumination sequence includes a first flash of light followed by a second flash of light, wherein the time between the first and second flashes of light is based on the time in which a human eye blinks;

the external lighting device includes a light bar module mounted to a roof of the vehicle;

the external lighting device includes a plurality of light sources arranged to produce up to 360 degree illumination directed away from the vehicle; and/or each of the one or more sensors includes an ultrasonic sensor.

According to some aspects of the present disclosure, a lighting method of a vehicle is provided. The method includes the steps of detecting an object approaching the vehicle using one or more sensors, identifying the object and assessing a threat level thereof based on input from the one or more sensors, and if the object is determined to be high threat, operating an external lighting device to produce an illumination sequence in the direction of the object. Examples of the third aspect can include any one or a combination of the following features:

the input includes a location, speed, distance, and size of the object as measured by the one or more sensors;

the illumination sequence includes one or more flashes of light followed by a steady stream of light in the direction of the object; and/or providing a user-input device for receiving user-specified settings used to trigger the external lighting device.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A lighting system of a vehicle, comprising:
an external lighting device;

one or more sensors configured to detect an object approaching the vehicle; and a controller configured to identify the object and assess a threat level thereof based on input from the one or more sensors, wherein if the controller determines that the object is high threat, the controller operates the external lighting device to produce an illumination sequence in the direction of the object, wherein the illumination sequence comprises one or more flashes of light followed by a steady stream of light in the direction of the object.

2. The lighting system of claim 1, wherein the external lighting device comprises a light bar module mounted to a roof of the vehicle.

3. The lighting system of claim 2, wherein the external lighting device comprises a plurality of light sources arranged to produce up to 360 degree illumination directed away from the vehicle.

4. The lighting system of claim 1, wherein each of the one or more sensors comprises an ultrasonic sensor.

5. The lighting system of claim 1, wherein the input comprises a location, speed, distance, and size of the object as measured by the one or more sensors.

6. The lighting system of claim 1, further comprising:
a camera system configured to capture images of the object when the steady stream of light illuminates the object.

7. The lighting system of claim 1, further comprising:
a user-input device configured to receive user-specified settings that are supplied to the controller and relied upon by the controller to determine when to trigger the external lighting device.

8. The lighting system of claim 1, wherein if the controller determines that the object is low threat, the controller deactivates the external lighting device or operates the external lighting device to produce another illumination sequence.

9. The lighting system of claim 1, further comprising:
a door control unit configured to automatically close any open windows and lock any unlocked doors of the vehicle based on the object being determined to be high threat by the controller.

10. A lighting system of a vehicle, comprising:
an external lighting device;
one or more sensors configured to detect a location, speed, distance, and size of an object approaching the vehicle; and
a controller configured to determine if the object is human based on input from the one or more sensors, and if so, operate the lighting device to produce an illumination sequence in the direction of the object, wherein the illumination sequence comprises a first flash of light followed by a second flash of light, and wherein the time between the first and second flashes of light is based on the time in which a human eye blinks.

11. The lighting system of claim 10, wherein the external lighting device comprises a light bar module mounted to a roof of the vehicle.

12. The lighting system of claim 10, wherein the external lighting device comprises a plurality of light sources arranged to produce up to 360 degree illumination directed away from the vehicle.

13. The lighting system of claim 10, wherein each of the one or more sensors comprises an ultrasonic sensor.

14. A lighting method of a vehicle, comprising the steps of:
detecting an object approaching the vehicle using one or more sensors;
identifying the object and assessing a threat level thereof based on input from the one or more sensors; and
if the object is determined to be high threat, operating an external lighting device to produce an illumination sequence in the direction of the object, wherein the illumination sequence comprises one or more flashes of light followed by a steady stream of light in the direction of the object.

15. The lighting method of claim 14, wherein the input comprises a location, speed, distance, and size of the object as measured by the one or more sensors.

16. The lighting method of claim 14, further comprising the step of:
providing a user-input device for receiving user-specified settings used to trigger the external lighting device.

17. The lighting system of claim 10, wherein if the controller determines that the object is low threat, the controller deactivates the external lighting device or operates the external lighting device to produce another illumination sequence.

18. The lighting system of claim 10, further comprising:
a door control unit configured to automatically close any open windows and lock any unlocked doors of the vehicle based on the object being determined to be high threat by the controller.

19. The lighting system of claim 10, wherein the time between the first and second flashes of light is from about 500 milliseconds to about 1000 milliseconds.

20. The lighting method of claim 14, further comprising the step of:
deactivating the external lighting device, if the object is determined to be low threat.

* * * * *